(12) United States Patent
Miyadera et al.

(10) Patent No.: US 7,291,397 B2
(45) Date of Patent: Nov. 6, 2007

(54) GAS BARRIER SUBSTRATE AND METHOD FOR MANUFACTURING THE SAME

(75) Inventors: Toshiyuki Miyadera, Tsurugashima (JP); Akira Sugimoto, Tsurugashima (JP); Ayako Yoshida, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 59 days.

(21) Appl. No.: 10/830,460

(22) Filed: Apr. 23, 2004

(65) Prior Publication Data

US 2004/0265554 A1    Dec. 30, 2004

(30) Foreign Application Priority Data

Apr. 25, 2003    (JP)    ............... 2003-121005

(51) Int. Cl.
*B32B 5/00*    (2006.01)

(52) U.S. Cl. ............ 428/426; 264/621; 264/642; 264/645; 428/689; 428/913; 313/504; 313/512

(58) Field of Classification Search ........ 428/689, 428/698, 699–702, 913, 426; 159/6.1; 264/642, 264/645, 621; 313/504, 512
See application file for complete search history.

(56) References Cited

U.S. PATENT DOCUMENTS

| 6,215,245 B1 * | 4/2001 | Mori ..................... 313/506 |
| 6,797,414 B2 * | 9/2004 | Sakaguchi ............ 428/690 |
| 6,815,887 B2 * | 11/2004 | Lee et al. .............. 313/512 |
| 6,893,744 B2 * | 5/2005 | Kim et al. ............. 428/690 |

OTHER PUBLICATIONS

Akira Sugimoto, "Development of Organic EL Film Displays", Optronics, 2001, Issue 3, pp. 122-126.

* cited by examiner

*Primary Examiner*—Archene Turner
(74) *Attorney, Agent, or Firm*—Sughrue Mion, PLLC

(57) ABSTRACT

A gas barrier substrate includes a compound gradient layer. The compound gradient layer includes an inorganic material and a resin material. A content of the inorganic material in the resin material varies in a thickness direction. The gas barrier substrate also includes a gas barrier layer. The gas barrier layer is made of an inorganic material and is bonded to the compound gradient layer. The compound gradient layer has a high content of inorganic material in an area near a bonding surface between the compound gradient layer and the gas barrier layer. The compound gradient layer may be bonded to a resin layer and may have a low content of inorganic material in an area near a surface bonded to the resin layer.

22 Claims, 1 Drawing Sheet

GAS BARRIER SUBSTRATE AND METHOD FOR MANUFACTURING THE SAME

BACKGROUND OF THE INVENTION

1. Field of the Invention

The present invention relates to gas barrier substrates, which have gas barrier properties, and to methods for manufacturing the same.

2. Description of the Related Art

Conventionally, gas barrier substrates that include a resin layer and an inorganic material layer on the resin layer and have the characteristic of not allowing the passage of gases such as oxygen and moisture (so-called gas barrier properties) are used as packaging for foods and medicinal products, and as the substrates of electrical components. Examples of electrical component substrates include display panel substrates for organic electroluminescence (hereafter referred to as "organic EL") display devices.

In organic EL display panel substrates, a gas barrier layer made of an inorganic material such as silicon oxynitride (SiON) is formed on a resin layer.

An organic EL display panel is produced by forming an anode made of a transparent material, an organic functional layer containing an organic compound that has electroluminescence characteristics, and a cathode in that order on the gas barrier layer of the gas barrier substrate.

In an organic EL display panel of the above-described structure, since moisture and gases such as oxygen that have passed through the resin layer of the gas barrier substrate are blocked by the gas barrier layer, these gases cannot penetrate the organic functional layer. Therefore, this prevents the occurrence of non-light-emitting areas (so-called dark spots), which are a form of deterioration of the organic functional layer caused by these gases (for example, see Akira Sugimoto, *Development of Organic EL Film Displays*, Optronics, 2001, Issue 3, pp. 122-126).

Peeling off occurs between the gas barrier layer and the resin layer due to external causes such as heat and an impact force being applied from the outside to the layers, since the adhesiveness between the gas barrier layer and the resin layer in the above-described gas barrier substrate is insufficient, and the peeling off damages the gas barrier layer. Gases penetrate any of these damaged areas so that the gas barrier properties of the layer cannot be maintained and dark spots are produced.

SUMMARY OF THE INVENTION

The above-described problem is one example of the issues that the present invention endeavors to solve.

According to one aspect of the present invention, there is provided a gas barrier substrate that includes a compound gradient layer and a gas barrier layer. The compound gradient layer includes an inorganic material and a resin material. A content (concentration) of the inorganic material in the resin material varies in a thickness direction of the compound gradient layer. The gas barrier layer has a gas barrier property. The gas barrier layer is bonded to the compound gradient layer. The gas barrier layer is made of an inorganic material. The compound gradient layer has a high(er) content of inorganic material in an area near a surface of the compound gradient layer that is bonded to the gas barrier layer. Because the compound gradient layer has a high(er) content of inorganic material in the vicinity of the bonding surface between the compound gradient layer and the gas barrier layer, it is possible to improve the adhesiveness between the compound gradient layer and the gas barrier layer. Therefore, peeling off of the gas barrier layer does not occur when external heat and impact are applied, thus making it possible to maintain the gas barrier properties of the substrate.

According to another aspect of the present invention, there is provided a novel method for manufacturing a gas barrier substrate. The method includes a step of forming a compound gradient layer that includes an inorganic material and a resin material. A content of the inorganic material in the resin material varies in a thickness direction. The compound gradient layer is formed go as to have a high content of inorganic material in an area near to a surface bonded to the gas barrier layer. The method also includes a step of forming a gas barrier layer having a gas barrier property. The gas barrier layer is bonded to the compound gradient layer. The gas barrier layer includes an inorganic material. Because the compound gradient layer is formed such that the content of inorganic material in the vicinity of the bonding surface between the compound gradient layer and the gas barrier layer is high, the adhesiveness between the gas barrier layer and the compound gradient layer is improved. Therefore, peeling off of the gas barrier layer does not occur during manufacture.

Other objects, aspects and advantages of the present invention will become apparent to those skilled in the art to which the present invention pertains from the following detailed description and appended claims when read and understood in conjunction with the accompanying drawings.

DETAILED DESCRIPTION OF THE INVENTION

Embodiments of gas barrier substrates according to the present invention are described below in detail with reference to the accompanying drawings.

Figure 1:
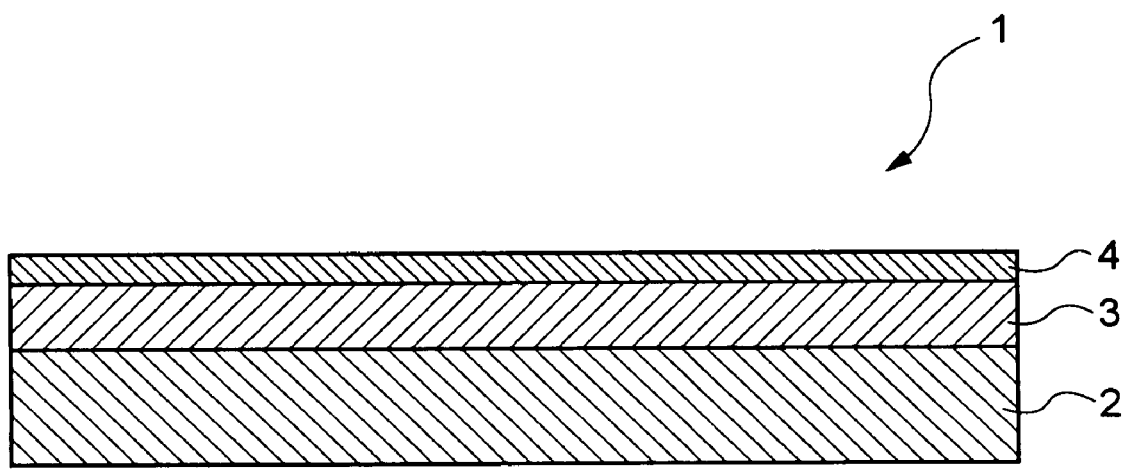
FIG. 1 is a cross sectional view of a gas barrier substrate according to one embodiment of the present invention.

As shown in FIG. 1, a gas barrier substrate 1 includes a resin layer 2. The resin layer 2 is made of a resin material such as polyethersulfone (PES), polyimide (PI), polyethylene terephthalate (PET), polycarbonate (PC), polymethyl methacrylate (PMMA), polyolefine (PO), polyalylate (PAR), polyethylene naphthalate (PEN), or polyetheretherketone (PEEK).

Arranged on the resin layer 2 is a compound gradient layer 3 that contains an inorganic material such as a metal oxide and a resin material. The content of inorganic material in the resin material varies in the thickness direction. The content of inorganic material in the compound gradient layer 3 is lower in areas near the surface of the compound gradient layer that is bonded to the resin layer 2. For example, the content of inorganic material in the compound gradient layer 3 increases continuously in the thickness direction, with the content of inorganic material being higher in the surface opposite to the surface that is bonded to the resin layer.

A silicon oxide or an aluminum oxide for example, which is a metal oxide, can be used for the inorganic material.

Resin materials that can be used include UV-curing acrylic resins, epoxy resins, phenol resins, silicone resins, melanin resins, urethane resins, urea resins, unsaturated polyester resins, polyacrylates, PC, vinyl chlorides, polyphenylene sulfides, polyamides, polyethylenes, polypropylenes, PET, polystyrenes, ABS resins, polyamide imides, polyacetals, polyvinylidene fluorides, polyetherimides, polyphenylene ethers, PEEK, and other such resin materials. It is also possible to use a combination of the above-mentioned resin materials.

A gas barrier layer 4 having gas barrier properties is formed on the compound gradient layer 3. The gas barrier layer 4 is made of a metal oxide, a metal nitride, or a metal oxynitride, such as silicon oxynitride.

With the gas barrier substrate of the above-described structure, the adhesiveness of the bonding surface between the compound gradient layer and the resin layer is improved due to the fact that the compound gradient layer has a small(er) content of inorganic material in the surface of the compound gradient layer that is bonded to the resin layer, and the adhesiveness of the bonding surface between the compound gradient layer and the gas barrier layer is improved due to the fact that the compound gradient layer has a large(r) content of inorganic material in the surface of the compound gradient layer that is bonded to the gas barrier layer. That is, by providing the above-described compound gradient layer, it is possible to form a bonding at the bonding interface with materials of the same kind, which improves the adhesiveness at the bonding surface. Due to the above-described adhesiveness improvement, peeling off of the gas barrier layer does not occur, thus enabling the gas barrier properties of the gas barrier substrate to be maintained.

It should be noted that the resin layer may be a resin film that has flexibility. By using such a resin film, it is possible to achieve a flexible gas barrier substrate. Since peeling off of the gas barrier layer does not happen with such a flexible gas barrier substrate, it is possible to maintain the gas barrier properties even when external force is applied.

As an example variation, the gas barrier layer may be made of a flexible glass. The flexible glass may have a thickness not greater than 100 μm for example. By using a flexible glass in the gas barrier layer and using a resin film in the resin layer, it is possible to obtain a gas barrier substrate that is flexible.

Figure 2:
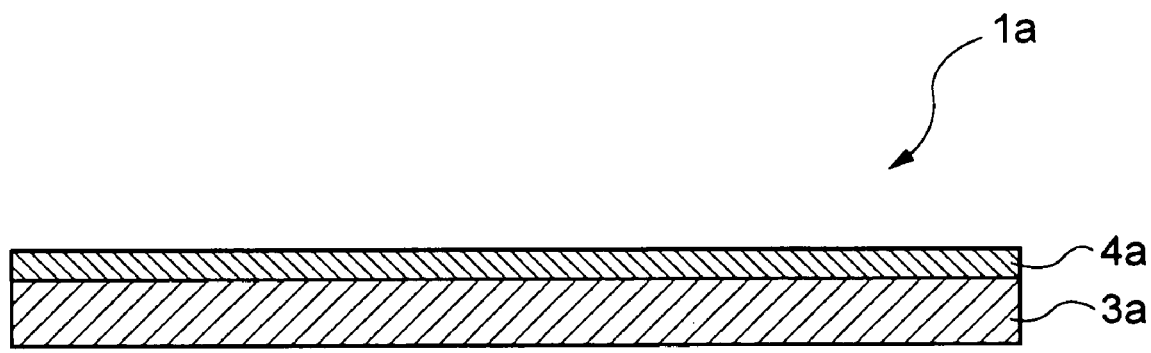
FIG. 2 is a cross sectional view of a modification example of a gas barrier substrate according to the present invention.

It should be noted that it is possible for the gas barrier substrate to not include a resin layer. That is, as shown in FIG. 2, a gas barrier substrate 1a may be made of a compound gradient layer 3a and a gas barrier layer 4a. The content of inorganic material in the compound gradient layer 3a varies in the thickness direction, with the content of inorganic material being higher in areas near to the surface of the compound gradient layer that is bonded to the gas barrier layer.

Since the above-described gas barrier substrate does not use a resin layer, it is possible to make the gas barrier substrate thinner, and thus it is possible to form a gas barrier substrate that is flexible.

It should be noted that the above-described gas barrier substrate can be used as a substrate for an organic EL display panel for example.

Next, a method for manufacturing the above-described gas barrier substrates is described.

A method for manufacturing a gas barrier substrate includes a compound gradient layer forming step of forming, on a resin layer, a compound gradient layer whose content of inorganic material varies in the thickness direction of the compound gradient layer.

The compound gradient layer forming step includes, for example, a mixed material preparation step of manufacturing a mixed material by mixing silica particles in a UV-curing acrylic resin, and a mixed material film forming step of distributing (arranging) the mixed material on a resin layer made of PES. The mixed material film forming stop is a step in which a mixed material film is formed using a film-forming method such as spin coating. After the mixed material film forming step, a provisional baking (sintering) (or preliminary heating) step of provisionally baking the mixed material film is performed, and then a gradient structure forming step of forming a gradient structure of silica particles in the provisionally baked mixed material film is performed.

The gradient structure forming step is a step in which silica particles are distributed unevenly in the mixed material film by centrifugal force using, for example, a centrifugal separator. The centrifugal separator is provided with a rotation device and a substrate holding unit that is rotated by the rotation device. The resin layer is held by the substrate holding unit. The resin layer is arranged in the vicinity of (or around) the rotational center of the substrate holding unit, and the mixed material film is arranged away from the rotational center of the substrate holding unit. By rotating the substrate, the silica particles in the mixed material film are moved by centrifugal force away from the bonding surface of the resin layer, thus forming a gradient structure.

After actual (non-provisional) baking is performed on the mixed material film in which the above-described gradient structure has been formed, the compound gradient layer is obtained by hardening the mixed material film with ultraviolet light irradiation.

After the compound gradient layer forming step, a gas barrier layer forming step is performed in which a gas barrier layer is formed. The gas barrier layer forming step is a step in which a silicon oxynitride layer is formed by sputtering for example. It should be noted that it is possible to use other film forming methods such as vapor deposition and CVD to suit the material of the gas barrier layer.

The gas barrier substrate is obtained by way of the above-described steps.

It should be noted that the compound gradient layer forming step is not limited to the use of the above-described centrifugal separation method, as long as a method is used by which a structure can be formed in which the content of inorganic material in the resin material varies in the thickness direction. For example, the compound gradient layer forming step may be a step that uses a multicolor injection mold, a lamination method, a sol-gel method, an impregnation method, or a sedimentation method. It is also possible for the compound gradient layer forming step to include (or combine) two or more of the above-mentioned methods.

When using a multicolor injection mold to form the compound gradient layer, it is possible to use a multicolor injection forming device provided with two or more injection cylinders. For example, it is possible to use a double-color injection molding device that is provided with a first injection cylinder to inject a resin material with a low(er) content of metal oxide and a second injection cylinder to inject a resin material with a high(er) content of metal oxide. It is also possible that the resin layer is inserted into the double-color injection molding device and that the resin material with a low(er) content of metal oxide and the resin material with a high(er) content of metal oxide are injected in order on the resin layer.

When using a lamination method to form the compound gradient layer, the process may include, for example, a mixed solution preparation step of manufacturing a plurality of alcohol solutions with different mixing ratios of metal oxide particles (e.g., silica particles) and an acrylic resin, and a mixed material film forming step of forming a mixed material film by distributing the mixed solutions on the resin layer and evaporating the solvents. Distribution and evaporation of the mixed solutions in the mixed material film forming step are repeated successively from the mixed solution with the lowest mixing ratio of metal oxide to the mixed solution with the highest mixing ratio of metal oxide, thus obtaining a laminated layer structure in which the content of oxide increases successively from the resin layer in the thickness direction. This laminated layer structure is taken as the compound gradient layer.

When using a sol-gel method to form the compound gradient layer, the process may include, for example, a mixed material preparation step of manufacturing a mixed material by mixing a metal alkoxide or a hydrolysate of a metal alkoxide and an organic high molecular compound, and a mixed material film forming step of distributing (placing) the mixed material on the resin layer to form a mixed material film. After the mixed material film forming step, a heat treatment step of heating the mixed material film is carried out.

In the heat treatment step, the compound gradient layer is formed by polycondensing a metal oxide, which has been formed by hydrolyzing a metal alkoxide, and an organic polymer. In other words, by distributing (placing) the mixed material on the resin layer, the organic high molecular compound adheres to the resin layer, and, those side chains of the organic high molecular compound that are positioned away from the resin layer undergo a polycondensing reaction with the metal oxide, thus forming a gradient structure.

With the above-described compound gradient layer forming method, the content of metal oxide in the compound structure of the metal oxide, which is obtained by a hydrolyzing reaction of the metal alkoxide, and the organic polymer increases from the bonding interface of the compound structure with the resin layer in the thickness direction of the compound structure.

Alkoxysilane, for example, can be used as the metal alkoxide. It is preferable that a hydrolysis group, such as an alkoxyl group that can bond with metal oxide by hydrolysis, is contained in the organic polymer. It is also preferable that the organic polymer is provided with a metal containing group such as a trimethoxysilyl group.

A compound gradient layer forming step that uses an impregnation method may include, for example, an impregnation step in which a solution containing a metal alkoxide is brought into contact with one surface of a resin layer, and impregnated so that the metal alkoxide forms a component gradient in the resin layer, and a polycondensation reaction step of causing a polycondensation reaction with the metal alkoxides. The metallic compound in the resin layer is fixed by the polycondensation reaction, thus obtaining a compound gradient layer in which the content of the metallic compound varies in the thickness direction.

A method for manufacturing a gas barrier substrate in which the gas barrier layer is a flexible glass is described below as a modification example.

A method for manufacturing such a gas barrier substrate includes, for example, a step of manufacturing a plurality of mixed materials with different mixing ratios of a UV-curing resin and an inorganic material, and a mixed material film forming step of forming a mixed material film by distributing the mixed material solutions on a resin layer and irradiating the mixed solutions with ultraviolet light.

Distribution of the mixed solutions and ultraviolet irradiation to the mixed solutions in the mixed material film forming step are repeated successively from the mixed solution with the lowest mining ratio of metal oxide to the mixed solution with the highest mixing ratio of metal oxide, thus obtaining a laminated layer structure of the mixed material films in which the content of oxide increases from the resin layer in the thickness direction. After the mixed material that has the highest content of inorganic material is distributed (placed), a flexible glass is arranged on the mixed material film before the mixed material film is hardened, and the flexible glass is made to adhere to the mixed material film. Ultraviolet light is irradiated through the flexible glass or the resin layer. The flexible glass is anchored at the same time as the mixed material film is hardened by the ultraviolet irradiation, thus obtaining the gas barrier substrate.

It should be noted that it is possible to reverse the lamination order in the above-described manufacturing method. That is, it is possible to form the mixed material film by distributing the mixed solutions on the flexible glass, and make the resin layer adhere using UV curing.

When forming a gas barrier substrate by distributing mixed solutions on a flexible glass, the compound gradient layer forming step may be a step in which the compound gradient layer is formed using a sedimentation method. For example, a mixed solution that is obtained by mixing a resin material, which is made of a UV-curing resin, and silica particles is distributed (placed) on the flexible glass substrate and left to stand. After the silica particles have settled (descended) toward the flexible glass, it is possible to make the resin layer adhere onto (firmly contact) the mixed material film and to bond the resin layer with ultraviolet irradiation.

Next, a method for manufacturing the gas barrier substrate 1a made of the compound gradient layer 3a and the gas barrier layer 4a as shown in FIG. 2 is described.

A method for manufacturing a gas barrier substrate 1a includes a compound gradient layer forming step of forming a compound gradient layer 3a. The compound gradient layer forming step includes, for example, a mixed solution preparation step of manufacturing a plurality of alcohol solutions with different mixing ratios of metal oxide particles such as silica and an acrylic resin. A mixed material film forming step is carried out in which a mixed material film is formed by distributing (placing) the mixed solutions on a glass substrate on which a releasing agent has been provided and evaporating the solvent. This mixed material film forming step is repeated successively from the mixed solution with the lowest mixing ratio of metal oxide particles to the mixed solution with the highest mixing ratio of metal oxide particles, thus obtaining a compound gradient layer in which the content of metal oxide particles increases from the glass substrate in the thickness direction.

The gas barrier layer is formed on the compound gradient layer obtained in the above-described step, and the compound gradient layer is peeled off from the glass substrate to obtain the gas barrier substrate. With this process, it is possible to obtain a thin gas barrier substrate.

It should be noted that it is possible to form the compound gradient layer using a compound gradient layer forming step such as the multicolor injection mold method described above.

When using a flexible glass for the gas barrier layer, a compound gradient layer forming method such as the above-described centrifugal separation method, sedimentation method, lamination method, and sol-gel method can be used.

This application is based on a Japanese Patent Application No. 2003-121005, and the entire disclosure thereof is incorporated herein by reference.

What is claimed is:

1. A gas barrier substrate comprising:
   a compound gradient layer, which includes an inorganic material and a resin material, and in which a content of the inorganic material in the resin material varies in a thickness direction of the compound gradient layer; and
   a gas barrier layer having a gas barrier property, which is bonded to the compound gradient layer, and contains an inorganic material;
   wherein the compound gradient layer has a higher content of inorganic material in an area in the vicinity of a bonding surface between the compound gradient layer and the gas barrier layer, than other areas.

2. The gas barrier substrate according to claim 1, further comprising a resin layer that opposes the gas barrier layer through the compound gradient layer, and that is bonded to the compound gradient layer;
   wherein the compound gradient layer has a lower content of inorganic material in a second area in the vicinity of a second boding surface between the compound gradient layer and the resin layer.

3. The gas barrier substrate according to claim 2, wherein the resin layer is a resin film that has flexibility.

4. The gas barrier substrate according to claim 1, wherein the inorganic material is a metal oxide such as silicon oxide or an aluminum oxide.

5. The gas barrier substrate according to claim 1, wherein the gas barrier layer is made of a metal oxide, a metal nitride, or a metal oxynitride.

6. The gas barrier substrate according to claim 5, wherein the metal oxynitride is silicon oxynitride.

7. The gas barrier substrate according to claim 1, wherein the gas barrier layer is made of a flexible glass.

8. A method of manufacturing a gas barrier substrate comprising:
   a compound gradient layer forming step of forming a compound gradient layer that includes an inorganic material and a resin material, and in which a content of the inorganic material in the resin material varies in a thickness direction of the compound gradient layer; and
   a gas barrier layer forming step of forming a gas barrier layer having a gas barrier property, which is bonded to the compound gradient layer at a first surface of the compound gradient layer, and contains an inorganic material;
   wherein in the compound gradient layer forming step, the compound gradient layer is formed so as to have a higher content of inorganic material in an area in the vicinity of the first surface bonded to the gas barrier layer, than other areas.

9. The method of manufacturing a gas barrier substrate according to claim 8 further comprising the step of preparing a resin layer, wherein the compound gradient layer forming step includes forming the compound gradient layer that is bonded to the resin layer at a second surface of the compound gradient layer, such that the content of the inorganic material is smaller in a second area in the vicinity of the second surface bonded to the resin layer.

10. The method of manufacturing a gas barrier substrate according to claim 8, wherein the compound gradient layer forming step uses a centrifugal separation method when forming the compound gradient layer.

11. The method of manufacturing a gas barrier substrate according to claim 8, wherein the compound gradient layer forming step uses a multicolor injection mold method when forming the compound gradient layer.

12. The method of manufacturing a gas barrier substrate according to claim 8, wherein the compound gradient layer forming step uses a lamination method when forming the compound gradient layer.

13. The method of manufacturing a gas barrier substrate according to claim 8, wherein the compound gradient layer forming step uses a sol-gel method when forming the compound gradient layer.

14. The method of manufacturing a gas barrier substrate according to claim 8, wherein the compound gradient layer forming step uses an impregnation method when forming the compound gradient layer.

15. The method of manufacturing a gas barrier substrate according to claim 8, wherein the compound gradient layer forming step uses a sedimentation method when forming the compound gradient layer.

16. The method of manufacturing a gas barrier substrate according to claim 8, wherein the inorganic material is a metal oxide such as silicon oxide or an aluminum oxide.

17. The method of manufacturing a gas barrier substrate according to claim 8, wherein the gas barrier layer is made of a metal oxide, a metal nitride, or a metal oxynitride.

18. The method of manufacturing a gas barrier substrate according to claim 17, wherein metal oxynitride is silicon oxynitride.

19. The method of manufacturing a gas barrier substrate according to claim 8, wherein the gas barrier layer is made of a flexible glass.

20. The method of manufacturing a gas barrier substrate according to claim 9, wherein the resin layer is a resin film that has flexibility.

21. A gas barrier substrate comprising:
   a first layer, which includes an inorganic material and a resin material, such that a content of the inorganic material in the resin material varies in a thickness direction of the first layer, the first layer having a first surface and a second surface opposite the first surface; and
   a second layer bonded to the first layer at the first surface of the first layer, the second layer having a gas barrier property, the second layer being made of an inorganic material;
   wherein the first layer has a higher content of inorganic material in the vicinity of the first surface of the first layer than other areas of the first layer.

22. The gas barrier substrate according to claim 21, further comprising a third layer bonded to the second surface of the first layer, wherein the first layer has a lower content of inorganic material in the vicinity of the second surface of the first layer.

* * * * *